United States Patent [19]

Brown

[11] Patent Number: 5,570,900
[45] Date of Patent: Nov. 5, 1996

[54] SIDE IMPACT HEAD AIR BAG

[75] Inventor: Louis R. Brown, Oxford, Mich.

[73] Assignee: TRW Vehicle Safety Systems Inc., Lyndhurst, Ohio

[21] Appl. No.: 448,202

[22] Filed: May 23, 1995

[51] Int. Cl.$^6$ .......................... B60R 21/22; B60R 21/24; B60R 21/28
[52] U.S. Cl. .................. 280/729; 280/730.2; 280/739; 280/743.1
[58] Field of Search ................ 280/730.2, 730.1, 280/729, 739, 743.1, 743.2, 728.1, 740, 742

[56] References Cited

U.S. PATENT DOCUMENTS

| | | | |
|---|---|---|---|
| 3,473,824 | 10/1969 | Carey et al. | 280/729 |
| 3,727,942 | 4/1973 | Arntson et al. | 280/743.1 |
| 3,748,477 | 7/1973 | Wulbrecht | 280/743.2 |
| 3,788,665 | 1/1974 | Noll et al. | 280/729 |
| 3,953,049 | 4/1976 | Surace et al. | 280/730.1 |
| 4,946,191 | 8/1990 | Putsch | 280/730.2 |
| 5,172,933 | 12/1992 | Strasser | 280/740 |
| 5,253,892 | 10/1993 | Satoh | 280/743.1 |
| 5,273,309 | 12/1993 | Lau et al. | 280/730.2 |
| 5,378,019 | 1/1995 | Smith et al. | 280/743.1 |
| 5,478,113 | 12/1995 | Rogers | 280/743.1 |

FOREIGN PATENT DOCUMENTS

| | | | |
|---|---|---|---|
| 0611684 | 8/1994 | European Pat. Off. | |
| 1-247242 | 10/1989 | Japan | 280/743.2 |
| 5-65047 | 3/1993 | Japan | 280/743.1 |
| 5-105024 | 4/1993 | Japan | 280/729 |

OTHER PUBLICATIONS

Advertisement brochure from PARS GmbH regarding "Seat Integrated Airbag for Side Impact Protection", PARS07.doc., Sep., 1993.

Advertisement from Johnson Controls, Inc. regarding "Structural Seat with Integrated Air Bag", Automotive Engineering, p. 27, May, 1994.

*Primary Examiner*—Kevin Hurley
*Assistant Examiner*—Peter C. English
*Attorney, Agent, or Firm*—Tarolli, Sundheim, Covell, Tummino & Szabo

[57] ABSTRACT

A side impact head air bag (50), when inflated, has a C-shaped body portion (160) which includes side sections (172, 174) and an end section (176). A channel portion (170) of the air bag (50) extends into the body portion (160) and has a terminal outlet (202) disposed between an inflation fluid inlet (200) and an outer end portion (190) of the body portion. The side sections (172, 174) are folded under the channel portion (170) and the air bag (50) is thereafter rolled into a compact shape when deflated. The channel portion (170) unrolls and inflates before the body portion (160) inflates.

34 Claims, 4 Drawing Sheets

SIDE IMPACT HEAD AIR BAG

BACKGROUND OF THE INVENTION

1. Technical Field

The present invention relates to a vehicle safety apparatus and, particularly, relates to an inflatable vehicle occupant restraint, such as an air bag, to help protect a vehicle occupant in the event of a side impact to the vehicle.

2. Description of the Prior Art

It is known to inflate an air bag to protect a vehicle occupant in the event of a side impact to a vehicle. Commonly, the air bag is stored in a deflated condition, together with an inflator, in the vehicle seat in which the occupant is seated. In the event of a side impact to the vehicle of a magnitude sufficient to require protection of the vehicle occupant, the inflator is actuated and the air bag is inflated into a position between the vehicle occupant and the adjacent vehicle door. The air bag can help protect the vehicle occupant from forcefully striking or being struck by parts of the vehicle such as the door. The air bag can also help protect the vehicle occupant from objects which might intrude through the door or a side window of the vehicle during the side impact.

During the side impact, the occupant of the vehicle seat may be out of position, that is, the head or neck of the occupant may be at least partially in the path of the inflating air bag. It is desirable, if this occurs, that the inflating air bag transmit a minimal amount of energy to the vehicle occupant.

SUMMARY OF THE INVENTION

The present invention is a vehicle occupant safety apparatus comprising an inflatable vehicle occupant restraint which, when inflated, helps protect a vehicle occupant in the event of a side impact to the vehicle of a magnitude sufficient to require protection of the vehicle occupant. The inflatable restraint has a deflated condition and an inflated condition. An inflator, when actuated, supplies inflation fluid to the inflatable restraint to inflate the inflatable restraint from the deflated condition to the inflated condition. The inflatable restraint has a body portion and an inflation fluid directing channel portion which extends into the body portion to direct inflation fluid into the body portion. The body portion of the inflatable restraint, when inflated, has an inner end portion located between the inflator and an outer end portion of the body portion. The channel portion of the inflatable restraint is connected with the inflator to receive inflation fluid from the inflator. The channel portion has a terminal outlet which is disposed intermediate the inner and outer end portions of the body portion for directing inflation fluid from the inflator into the body portion to inflate the body portion.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
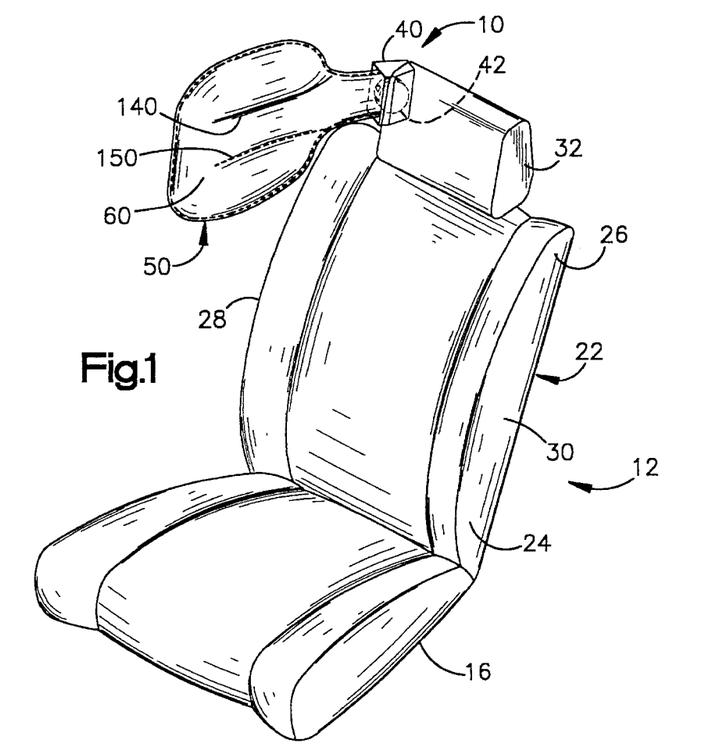
FIG. 1 is a perspective view of a vehicle seat and an air bag constructed in accordance with the present invention, showing the air bag in an inflated condition.

The present invention relates to a vehicle safety apparatus and, particularly, relates to an inflatable vehicle occupant restraint, such as an air bag to help protect a vehicle occupant in the event of a side impact to the vehicle of a magnitude sufficient to require protection of the vehicle occupant. The present invention is applicable to various vehicle safety apparatus constructions. As representative of the present invention, FIG. 1 illustrates a vehicle safety apparatus 10.

Figure 2:
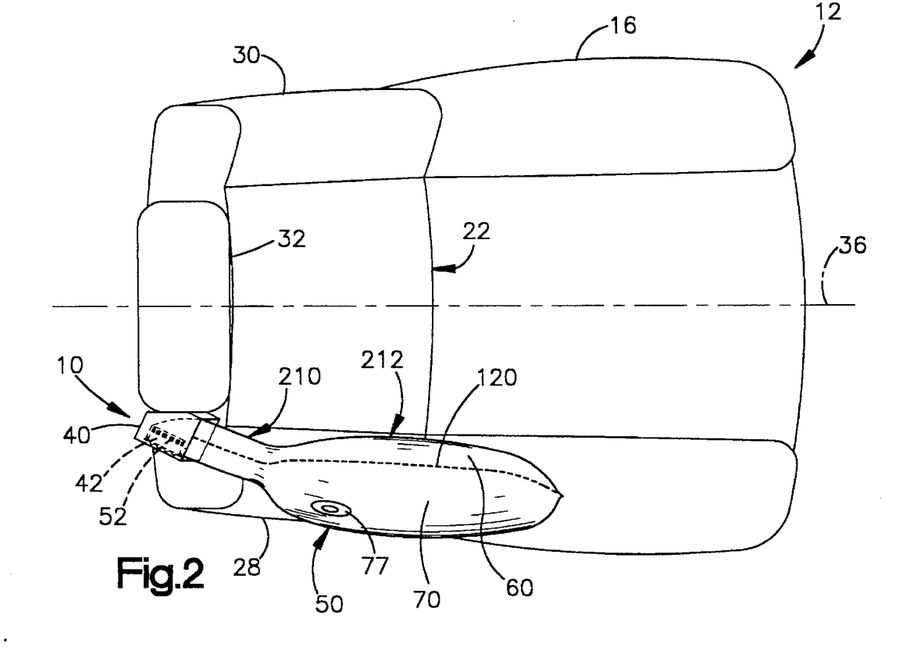
FIG. 2 is a schematic top plan view of the vehicle seat and air bag of FIG. 1.

The safety apparatus 10 is mounted on a vehicle seat 12 which is illustrated as a front passenger seat for an occupant (not shown) of a vehicle. The seat 12 (FIGS. 1–2) includes a seat bottom cushion 16 and a seat back 22 connected with the seat bottom cushion 16. The seat back 22 has a lower portion 24 and an upper portion 26. The seat back 22 also has an outboard side 28 and an inboard side 30.

A headrest 32 is supported on or is formed as one piece with the upper portion 26 of the seat back 22. A front-to-back axis 36 (FIG. 2) extends through the seat 12 in a direction parallel to the fore/aft centerline of the vehicle. The axis 36 is centered between the outboard side 28 and the inboard side 30 of the seat back 22.

The safety apparatus 10 (FIGS. 1 and 2) includes a housing 40, an inflator 42, and an inflatable restraint or air bag 50. The inflator 42 is preferably a pyrotechnic inflator which includes gas generating material which, when ignited, generates inflation fluid in the form of gas to inflate the air bag 50. The inflator 42 alternatively could be an inflator which includes some stored gas which is released from the inflator to inflate the air bag 50. The inflator 42 has one or more fluid outlets 52 located inside the housing 40 for directing inflation fluid into the housing upon actuation of the inflator to inflate the air bag 50. The vehicle in which the safety apparatus 10 is mounted includes known electric circuitry (not shown) for sensing a side impact to the vehicle of a magnitude sufficient to require protection of the vehicle occupant and for actuating the inflator 42 in response to the sensing of said side impact.

Figure 3:
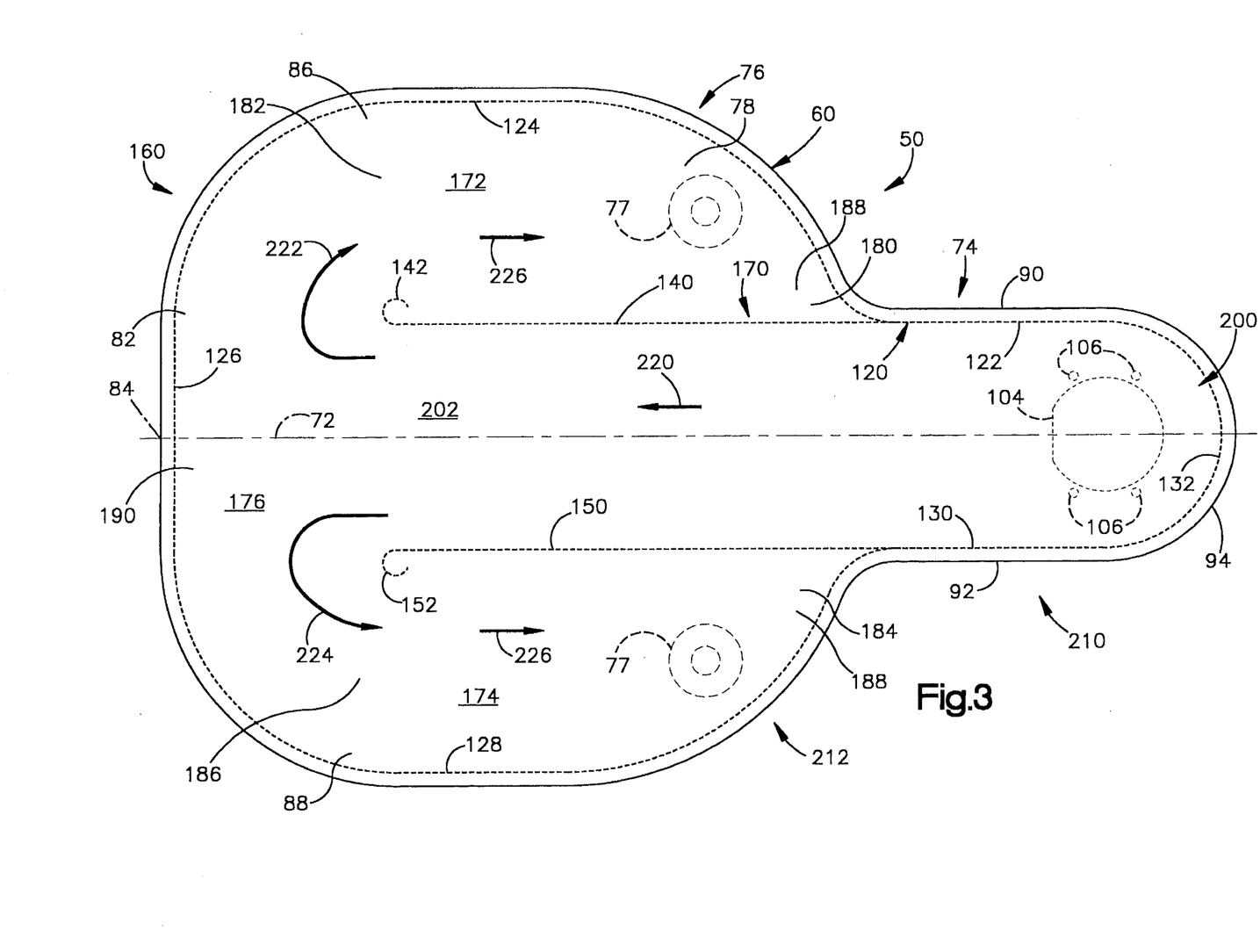
FIG. 3 is an elevational view of the air bag of FIG. 1 shown in a deflated and unfolded condition.
Figures 4, 5, 6, 7:
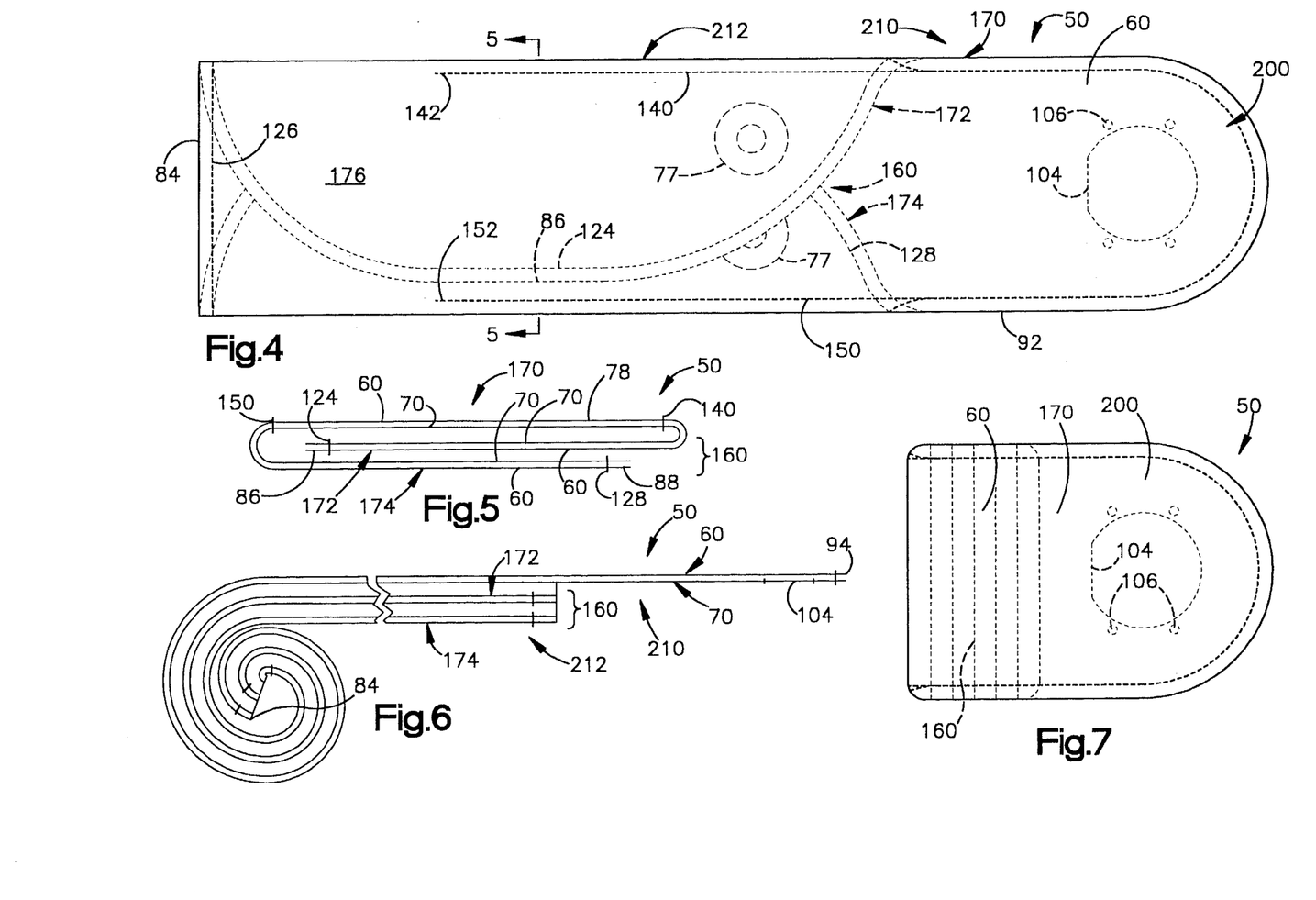
FIG. 4 is a view similar to FIG. 3 showing the air bag of FIG. 1 in a partially folded condition.
FIG. 5 is a sectional view taken along line 5—5 of FIG. 4.
FIG. 6 is a view illustrating a first stage in the rolling of the air bag of FIG. 1 into a folded and rolled condition.
FIG. 7 is a view similar to FIG. 4 showing the air bag of FIG. 1 in the folded and rolled condition.

The air bag 50 (FIG. 2) is formed from two separate fabric material panels, i.e., an inner panel 60 and an outer panel 70. The panels 60 and 70 are sewn together in a manner as illustrated in FIGS. 3–5. The panels 60 and 70 are substantially identical to each other and therefore only the inner panel 60 is described in detail.

The inner panel 60 is a single piece of fabric material which in the preferred embodiment is symmetrical about a longitudinal central axis 72 of the air bag 50. The inner panel 60 has an elongate neck portion 74 and an oblong head portion 76. The inner panel 60 has an outer major side surface 78 (FIG. 9) and an inner major side surface 80.

The head portion 76 (FIG. 3) of the inner panel 60 has an outer peripheral end portion 82 which includes a terminal end 84 of the air bag 50 located on the axis 72. The end portion 82 merges into parallel axially extending side portions 86 and 88. The side portions 86 and 88 merge into the neck portion 74 of the inner panel 60. The neck portion 74 of the inner panel 60 is defined generally by parallel axially extending side portions 90 and 92 and an arcuate inner end portion 94.

The outer panel 70 of the air bag 50 underlies the inner panel 60 as viewed in FIG. 3 and includes an elongate neck portion and an oblong head portion. The neck portion of the outer panel 70 includes an inflator opening 104 and a plurality of fastener openings 106 for mounting the air bag 50 in a known manner on the housing 40 in fluid communication with the inflator 42. An inner major side surface 108 (FIG. 9) of the outer panel 70 is presented toward the inner major side surface 80 of the inner panel 60. The outer panel 70 may also include one or more vents 77 of a known construction for venting inflation fluid from the air bag 50 in a known manner.

The air bag 50 is assembled by stitching the inner panel 60 to the outer panel 70 with a double-needle outer stitching section indicated schematically at 120 (FIG. 3). Although not shown, the air bag 50 is preferably sewn together when the air bag is, in effect, "inside out", and then inverted or turned right side out to the condition shown in the drawings. The seam formed at the outer stitching section 120 is preferably top stitched in a known manner (not shown).

The outer stitching section 120 (FIG. 3) includes a linear first part 122 which extends along the side portion 90 of the neck portion 74 of the inner panel 60 and along the corresponding underlying part of the neck portion of the outer panel 70. A curved second part 124 of the outer stitching section 120 extends along the side portion 86 of the inner panel 60 and along the corresponding underlying part of the head portion of the outer panel 70.

A third part 126 of the outer stitching section 120 extends along the outer end portion 82 of the inner panel 60 and along the corresponding underlying part of the outer panel 70. A fourth part 128 of the outer stitching section 120 extends along the side portion 88 of the inner panel 60 and along the corresponding underlying part of the head portion of the outer panel 70.

The outer stitching section 120 includes a straight fifth part 130 which extends along the side portion 92 of the neck portion 74 of the inner panel 60 and along the corresponding underlying part of the neck portion of the outer panel 70, in a direction parallel to the first part 122 of the outer stitching section. A sixth and final part 132 of the outer stitching section 120 extends along the arcuate inner end portion 94 of the inner panel 60 and along the corresponding underlying part of the outer panel 70.

The air bag 50 also includes parallel upper and lower stitching sections 140 and 150. The upper stitching section 140 includes a series of stitches, through both the inner panel 60 and the outer panel 70, which extend in a straight line from the first part 122 of the outer stitching section 120 toward the outer end portion 82 of the air bag 50. The upper stitching section 140 has a terminus in the form of a circular pattern 142 which is spaced inward from the outer end portion 82 and acts to distribute the surface stress over a larger area.

The lower stitching section 150 extends parallel to and is spaced apart from the upper stitching section 140. The lower stitching section 150 includes a series of stitches, through both the inner panel 60 and the outer panel 70, which extend in a straight line from the fifth part 130 of the outer stitching section 120 toward the outer end portion 82 of the air bag 50. The lower stitching section 150 has a terminus in the form of a circular pattern 152 which is spaced inward from the outer end portion 82 of the air bag 50 by the same distance as the circular pattern 142 of the upper stitching section 140.

The upper and lower stitching sections 140 and 150 divide the air bag 50 into a body portion 160 of the air bag and a channel portion 170 of the air bag. The body portion 160 and the channel portion 170 of the air bag 50 are described below in detail with reference to FIG. 3, which shows only the inner panel 60 of the air bag. It should be understood that each of the body portion 160 and the channel portion 170 of the air bag includes the described portions of the inner panel 60 and the respective underlying portions of the outer panel 70 as viewed in FIG. 3. Thus, each of the body portion 160 and the channel portion 170 of the air bag 50 defines a portion of the overall inflation fluid volume of the air bag.

The body portion 160 of the air bag 50 is C-shaped in configuration as viewed in FIG. 3 and includes an upper side section 172, a lower side section 174, and an end section 176. The upper side section 172 is disposed above the upper stitching section 140 and to the right of its terminus 142 as viewed in FIG. 3. The upper side section 172 has an inner end portion 180 which is closed by the intersecting stitching sections 122, 124 and 140. The upper side section 172 also has an outer end portion 182 which is open into the end section 176 of the body portion 160.

The lower side section 174 of the body portion 160 of the air bag 50 is disposed below the lower stitching section 150 and to the right of its terminus 152 as viewed in FIG. 3. The lower side section 174 has an inner end portion 184 which is closed by the intersecting stitching sections 128, 130 and 150. An outer end portion 186 of the lower side section 174 opens into the end section 176 of the body portion 160.

The end section 176 of the body portion 160 of the air bag 50 is disposed to the left of the stitching sections 140 and 150 as viewed in FIG. 3. The end section 176 extends between the outer end portion 182 of the upper side section 172 and the outer end portion 186 of the lower side section 174 of the body portion 160. The end section 176 establishes fluid communication between the upper side section 172 and the lower side section 174 of the body portion 160 of the air bag 50.

The body portion 160, when inflated, has an inner end portion 188 which includes the inner end portion 180 of the upper side section 172 and the inner end portion 184 of the lower side section 174. The body portion 160, when inflated, also has an outer end portion 190 which includes the end section 176 of the body portion 160.

When the body portion 160 of the air bag 50 is inflated, its inner end portion 188 is located between the inflator 42 and the outer end portion 190 of the body portion 160. The outer end portion 190 of the body portion 160 has surfaces for directing flow of fluid into the side sections 172 and 174 of the body portion 160. Specifically, the inner side surface 80 (FIG. 9) of the inner panel 60 and the inner side surface 108 of the outer panel 70, where joined by the third part 126 of the outer stitching section 120, are presented toward the inflator 42 upon inflation of the air bag 50.

The channel portion 170 of the air bag 50 is disposed between the upper side section 172 and the lower side section 174 of the body portion 160. The upper and lower edges of the channel portion 170 are defined by the upper stitching section 140 and the lower stitching section 150, respectively. The channel portion 170 of the air bag 50 thus blocks fluid flow between the inner end portion 180 of the upper side section 172 of the body portion 160 and the inner end portion 184 of the lower side section 174 of the body portion of the air bag.

The channel portion 170 of the air bag 50 is linear and tubular in configuration. The channel portion 170 has an inlet 200 connected with the inflator 42 to receive inflation fluid from the inflator. The inlet 200 includes the neck portion 74 of the inner panel 60 and the neck portion of the outer panel 70. The channel portion 170 has a terminal outlet 202 located between the inflator 42 and the outer end portion 190 of the body portion 160 of the air bag 50. The terminal outlet 202 is defined generally by the terminus 142 of the upper stitching section 140 and the terminus 152 of the lower stitching section 150. The terminal outlet 202 opens into the end section 176 of the body portion 160 of the air bag 50, for directing inflation fluid from the inflator 42 into the body portion of the air bag.

The head portion 76 of the inner panel 60 and the head portion of the outer panel 70 together form a head portion 212 of the air bag 50. The neck portions of the inner and outer panels 60 and 70 together form a neck portion 210 of the air bag 50. The neck portion 210 of the air bag 50 is tubular in configuration and includes the inflator opening 104. The longitudinal central axis 72 of the air bag 50 extends through the neck portion 210 of the air bag 50 and forms a longitudinal central axis of the neck portion.

The neck portion 210 of the air bag 50, when inflated, has a relatively small height as measured in the vertical direction transverse to the axis 72. The head portion 212 of the air bag 50, when inflated, has a relatively large height as measured in the vertical direction transverse to the axis 72. The inflated air bag 50 is thus paddle-shaped in configuration, as best seen in FIG. 3.

The air bag 50 is folded and rolled inside the housing 40 of the safety apparatus 10 in a manner shown schematically in FIGS. 4–7. The side sections 172 and 174 of the body portion 160 of the air bag 50 are first folded as flaps to underlie the channel portion 170 of the air bag, to a condition as shown schematically in FIG. 5. (In FIGS. 5, 6 and 9 each of the panels 60 and 70 is illustrated with only a single line, rather than with a double line and section markings.) The upper side section 172 is folded first, at about the upper stitching section 140, to underlie the channel portion 170 of the air bag 50. The lower side section 174 is thereafter folded at about the lower stitching section 150 to underlie the folded upper side section 172. The air bag thus is in the folded condition shown in FIGS. 4 and 5. In this condition, the folded air bag 50 is not significantly wider than the width of the channel portion 170 (that is, in a direction as measured from top to bottom in FIG. 4).

Next, the folded air bag 50 is rolled up toward the inflator 42 as shown schematically in FIG. 6. The terminal end 84 of the air bag 50 is rolled under the folded side sections 172 and 174 of the body portion 160. The air bag 50 is continued to be rolled until it is in a compact rolled shape disposed within the housing 40 adjacent to the inflator 42.

Figure 8:
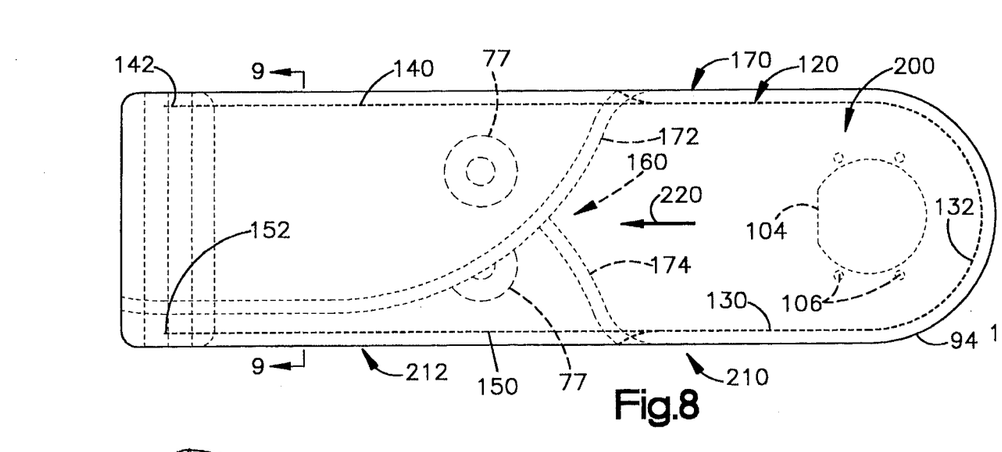
FIG. 8 is a view illustrating a first stage in the inflation of the air bag of FIG. 1.

In the event of a side impact to the vehicle of a magnitude sufficient to require protection of the vehicle occupant, the inflator 42 is actuated in a known manner and directs inflation fluid under pressure into the neck portion 210 of the air bag 50. The inflation fluid flows through the neck portion 210 of the air bag 50 and then into the head portion 212. The air bag 50 inflates in a manner as illustrated schematically in FIGS. 8–10 from a deflated condition in which it is folded and rolled to an inflated condition. The safety apparatus 10 is mounted on the seat back 22 so that the air bag 50 deploys in a forward and outward direction relative to the front-to-back axis 36.

The inflation fluid from the inflator 42 flows into the inlet 200 of the channel portion 170 of the air bag 50. The inflation fluid flows through the channel portion 170 from the inlet 200 toward the terminal outlet 202. While in the channel portion 170, the inflation fluid flows in a first direction 220, that is, to the left as viewed in FIGS. 3, 8 and 10, toward the terminal outlet 202 of the channel portion.

Figure 9:
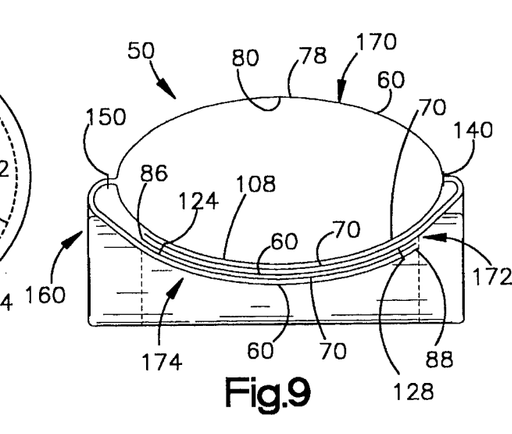
FIG. 9 is a sectional view taken along line 9—9 of FIG. 8.
Figure 10:
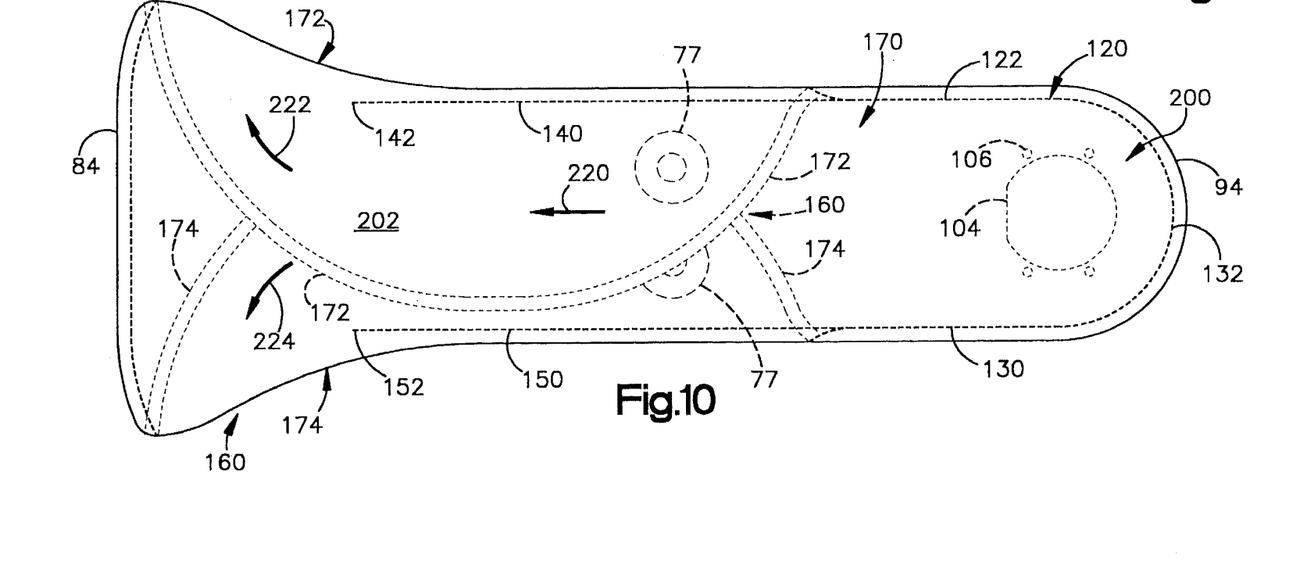
FIG. 10 is a view similar to FIG. 8 illustrating a second stage in the inflation of the air bag.

As the inflation fluid flows from the inlet 200 toward the outlet 202 of the channel portion 170, the channel portion inflates as shown schematically in FIG. 9. While the channel portion 170 of the air bag 50 is inflating, the upper stitching section 140 blocks flow of inflation fluid into the upper side section 172 of the body portion 160 of the air bag 50. The lower stitching section 150 blocks flow of inflation fluid into the lower side section 174 of the body portion 160 of the air bag 50. As a result, the body portion 160 of the air bag 50 does not inflate until the inflation fluid enters the body portion through the terminal outlet 202 of the channel portion 70. When this occurs, the channel portion 170 is already inflated or at least substantially inflated as seen in FIG. 9.

Because of the narrow tubular configuration of the channel portion 170 of the air bag 50, the inflating air bag stays in a tight bundle or small clump as the channel portion and the body portion 160 unroll and the channel portion inflates. When the channel portion 170 is inflated, and inflation fluid begins to flow into the body portion 160, the body portion of the air bag is still, to a large extent, folded against the channel portion as shown schematically in FIG. 10.

The rolled condition of the folded body portion 160 and channel portion 170 provides a high resistance to deployment during the initial stages of deployment of the air bag 50. This reduces the initial deployment speed of the air bag 50. If the head or neck of the occupant of the seat 12 is in the path of the inflating air bag 50, then the reduced initial deployment speed of the air bag results in a reduced amount of impact energy being transmitted to the head and neck of the vehicle occupant.

After the channel portion 170 of the air bag 50 is substantially inflated, the body portion 160 of the air bag inflates. Inflation fluid flows from the terminal outlet 202 of the channel portion 170 into the end section 176 of the body portion 160. The inflation fluid engages the inner side surfaces 80 and 108 of the inner and outer panels 60 and 70 at the terminal end 84 of the air bag 50. The inflation fluid is redirected by the surfaces 80 and 108 as indicated by the arrows 222 and 224 in FIGS. 3 and 10. The inflation fluid flows in a second direction 226 opposite to the first direction 220, into the side sections 172 and 174 of the body portion 160 of the air bag 50.

The side sections 172 and 174, which were folded as flaps under the channel portion 170, inflate and unfold away from the channel portion, in an outward direction away from the vehicle occupant. The low pressure created by the vents 77 ensures that the inflation fluid flows to the inner end portion 188 and inflates the upper and lower side sections 172 and 174 of the air bag 50. The body portion 160 of the air bag 50 billows out to a position between the occupant's head and the side structure of the vehicle. When the air bag 50 is inflated, the upper stitching section 140 and the lower stitching section 150 act as tethers and effectively shape the air bag into a three-cushion configuration of an appropriate thickness to fit between the head of the vehicle occupant and the side structure of the vehicle.

From the above description of the invention, those skilled in the art will perceive improvements, changes and modifications in the invention. Such improvements, changes and modifications within the skill of the art are intended to be covered by the appended claims. This invention can also be applied to the design, construction, and deployment of driver and/or passenger frontal impact air bags.

Having described the invention, I claim:

1. A vehicle occupant safety apparatus comprising:

an inflatable vehicle occupant restraint which, when inflated, helps protect a vehicle occupant in the event of a side impact to the vehicle of a magnitude sufficient to require protection of the vehicle occupant, said inflatable restraint having a deflated condition and an inflated condition; and an inflator for, when actuated, supplying inflation fluid to said inflatable restraint to inflate said inflatable restraint from the deflated condition to the inflated condition;

said inflatable restraint having a body portion and having an inflation fluid directing channel portion extending into said body portion;

said body portion of said inflatable restraint having inner and outer end portions;

said channel portion of said inflatable restraint being connected with said inflator to receive inflation fluid from said inflator;

said channel portion having a terminal outlet which is disposed intermediate said inner and outer end portions of said body portion;

said channel portion directing inflation fluid to flow in a first direction from said inflator to said terminal outlet of said channel portion and into said body portion to inflate said body portion;

said outer end portion of said body portion being disposed in the path of fluid flow from said terminal outlet of said channel portion, said outer end portion of said body portion having surface portions which change the direction of inflation fluid flowing from said terminal outlet of said channel portion from the first direction to a second direction, opposite to said first direction, to inflate said body portion of said inflatable restraint.

2. An apparatus as set forth in claim 1 wherein said surface portions are disposed on first and second layers of fabric material sewn together at a terminal end of said inflatable restraint.

3. An apparatus as set forth in claim 1 wherein said surface portions direct the inflation fluid flowing from said terminal outlet of said channel portion into first and second flow paths each extending in the second direction from said surface portions toward said inner end portion of said body portion of said inflatable restraint.

4. An apparatus as set forth in claim 3 wherein said body portion of said inflatable restraint is generally C-shaped in configuration including a pair of side sections joined together by a central section, said central section including said outer end portion of said body portion, each one of said first and second flow paths extending along a respective one of said side sections toward an inner end portion of said respective side section.

5. An apparatus as set forth in claim 4 wherein said inner end portions of said side sections include vents for creating low pressure areas at the far ends of the respective flow paths along said respective side sections.

6. An apparatus as set forth in claim 1 wherein said inflatable restraint when in the deflated condition is rolled into a compact shape disposed adjacent to said inflator, said channel portion of said inflatable restraint unrolling as said channel portion inflates, said body portion of said inflatable restraint inflating after said channel portion of said inflatable restraint unrolls and inflates.

7. An apparatus as set forth in claim 6 wherein said body portion of said inflatable restraint comprises a pair of flaps having edges which are connected with said channel portion of said inflatable restraint, said flaps being folded over to lie adjacent to said channel portion, said channel portion and said folded flaps being rolled into a compact shape disposed adjacent to said inflator when said inflatable restraint is in the deflated condition, said channel portion of said inflatable restraint and said flaps unrolling as said channel portion inflates, said flaps inflating and unfolding away from said channel portion after said channel portion of said inflatable restraint unrolls and inflates.

8. A vehicle occupant safety apparatus comprising:

an inflatable vehicle occupant restraint which, when inflated, helps protect a vehicle occupant in the event of a side impact to the vehicle of a magnitude sufficient to require protection of the vehicle occupant, said inflatable restraint having a deflated condition and an inflated condition; and an inflator for, when actuated, supplying inflation fluid to said inflatable restraint to inflate said inflatable restraint from the deflated condition to the inflated condition;

said inflatable restraint having a body portion and an inflation fluid directing channel portion extending into said body portion;

said body portion of said inflatable restraint having a C-shaped configuration, when inflated, including (i) an upper side section having a closed inner end portion and an open outer end portion, (ii) a lower side section having a closed inner end portion and an open outer end portion, and (iii) an end section extending between said outer end portions of said upper and lower side sections and establishing fluid communication between said outer end portions of said upper and lower side sections;

said channel portion of said inflatable restraint being disposed intermediate said upper and lower side sections of said body portion, said channel portion blocking fluid flow between said inner end portions of said upper and lower side sections;

said channel portion having an inlet connected with said inflator to receive inflation fluid from said inflator;

said channel portion having a terminal outlet into said end section of said body portion for directing inflation fluid from said inflator into said body portion to inflate said body portion.

9. An apparatus as set forth in claim 8 including a vent in said inner end portion of said lower side section and a vent in said inner end portion of said upper side section for creating low pressure areas at said inner end portions of said side sections.

10. An apparatus as set forth in claim 8 wherein said body portion of said inflatable restraint comprises a pair of flaps having edges which are connected with said channel portion of said inflatable restraint, said flaps being folded against said channel portion when said inflatable restraint is in the deflated condition, said flaps unfolding away from said channel portion when said inflatable restraint is inflated.

11. An apparatus as set forth in claim 10 wherein said channel portion and said flaps are rolled into a compact shape disposed adjacent to said inflator, said channel portion of said inflatable restraint and said flaps unrolling as said channel portion inflates, said flaps unfolding and inflating after said channel portion of said inflatable restraint unrolls and inflates.

12. An apparatus as set forth in claim 11 wherein said channel portion is tubular in configuration, said inflatable restraint comprising first and second layers of fabric material and two spaced apart stitching sections which join said first and second layers and which define between them said channel portion of said inflatable restraint, each one of said stitching sections defining an edge of a respective one of said flaps.

13. An apparatus as set forth in claim 8 wherein said body portion of said inflatable restraint includes surface portions which change the direction of inflation fluid flowing from said channel portion into said body portion, said surface portions being disposed on first and second layers of fabric material sewn together at a terminal end of said inflatable restraint.

14. An apparatus as set forth in claim 13 wherein said surface portions direct the inflation fluid flowing from said terminal outlet of said channel portion into first and second flow paths each extending from said surface portions toward said inner end portions of said side sections of said body portion of said inflatable restraint.

15. A vehicle occupant safety apparatus comprising:

an inflatable vehicle occupant restraint which, when inflated, helps protect a vehicle occupant in the event of a side impact to the vehicle of a magnitude sufficient to require protection of the vehicle occupant, said inflatable restraint having a deflated condition and an inflated condition; and an inflator for, when actuated, supplying inflation fluid to said inflatable restraint to inflate said inflatable restraint from the deflated condition to the inflated condition;

said inflatable restraint having a body portion and having an inflation fluid directing channel portion extending into said body portion to direct inflation fluid into said body portion;

said body portion of said inflatable restraint, when inflated, having an inner end portion located between said inflator and an outer end portion of said body portion;

said channel portion of said inflatable restraint being connected with said inflator to receive inflation fluid from said inflator;

said channel portion having a terminal outlet which is disposed intermediate said inner and outer end portions of said body portion for directing inflation fluid from said inflator into said body portion to inflate said body portion;

said body portion of said inflatable restraint comprising a pair of flaps having edges which are connected with said channel portion of said inflatable restraint, said flaps being folded to lie adjacent to said channel portion when said inflatable restraint is in the deflated condition to resist flow of inflation fluid into said flaps, said flaps unfolding away from said channel portion when said inflatable restraint is inflated;

said channel portion and said folded flaps being rolled into a compact shape disposed adjacent to said inflator to resist flow of inflation fluid into said channel portion and into said folded flaps thereby to reduce the speed of the deployment of said inflatable restraint and to reduce the impact to the head and neck of an out of position vehicle occupant, said channel portion of said inflatable restraint and said flaps unrolling as said channel portion inflates, said flaps unfolding and inflating after said channel portion of said inflatable restraint unrolls and inflates.

16. A vehicle occupant safety apparatus comprising:

an inflatable vehicle occupant restraint which, when inflated, helps protect a vehicle occupant in the event of a side impact to the vehicle of a magnitude sufficient to require protection of the vehicle occupant, said inflatable restraint having a deflated condition and an inflated condition; and an inflator for, when actuated, supplying inflation fluid to said inflatable restraint to inflate said inflatable restraint from the deflated condition to the inflated condition;

said inflatable restraint having a body portion and having an inflation fluid directing channel portion extending into said body portion to direct inflation fluid into said body portion;

said body portion of said inflatable restraint, when inflated, having an inner end portion located between said inflator and an outer end portion of said body portion;

said channel portion of said inflatable restraint being connected with said inflator to receive inflation fluid from said inflator;

said channel portion having a terminal outlet which is disposed intermediate said inner and outer end portions of said body portion for directing inflation fluid from said inflator into said body portion to inflate said body portion;

said body portion of said inflatable restraint comprising a pair of flaps having edges which are connected with said channel portion of said inflatable restraint, said flaps being folded to lie adjacent to said channel portion when said inflatable restraint is in the deflated condition, said flaps unfolding away from said channel portion when said inflatable restraint is inflated.

17. An apparatus as set forth in claim 16 wherein said channel portion and said folded flaps are rolled into a compact shape disposed adjacent to said inflator, said channel portion of said inflatable restraint and said flaps unrolling as said channel portion inflates, said flaps unfolding and inflating after said channel portion of said inflatable restraint unrolls and inflates.

18. An apparatus as set forth in claim 17 wherein said channel portion is tubular in configuration, said inflatable restraint comprising first and second layers of fabric material and two spaced apart stitching sections which join said first and second layers and which define between them said channel portion of said inflatable restraint, each one of said stitching sections defining an edge of a respective one of said flaps.

19. A vehicle occupant safety apparatus comprising:

an inflatable vehicle occupant restraint which, when inflated, helps protect a vehicle occupant in the event of a side impact to the vehicle of a magnitude sufficient to require protection of the vehicle occupant, said inflatable restraint having a deflated condition and an inflated condition; and an inflator for, when actuated, supplying inflation fluid to said inflatable restraint to inflate said inflatable restraint from the deflated condition to the inflated condition;

said inflatable restraint having a body portion and having an inflation fluid directing channel portion extending into said body portion to direct inflation fluid into said body portion;

said body portion of said inflatable restraint, when inflated, having an inner end portion located between said inflator and an outer end portion of said body portion;

said channel portion of said inflatable restraint being connected with said inflator to receive inflation fluid from said inflator;

said channel portion having a terminal outlet which is disposed intermediate said inner and outer end portions of said body portion for directing inflation fluid from said inflator into said body portion to inflate said body portion;

said channel portion being tubular in configuration, said inflatable restraint comprising first and second layers of fabric material and two spaced apart stitching sections which join said first and second layers and which define between them said channel portion of said inflatable restraint, each one of said stitching sections defining an edge of said body portion of said inflatable restraint.

20. A vehicle occupant safety apparatus comprising:

an inflatable vehicle occupant restraint having a deflated condition and an inflated condition, said inflatable restraint, when inflated, helping to protect a vehicle occupant in the event of an impact to a side of the vehicle, the impact being of a magnitude sufficient to require protection of the vehicle occupant, said inflatable restraint inflating into a space between the vehicle occupant and a side of the vehicle; and an inflator for, when actuated, supplying inflation fluid to said inflatable restraint to inflate said inflatable restraint from the deflated condition to the inflated condition;

said inflatable restraint having a body portion and having an inflation fluid directing channel portion extending into said body portion to direct inflation fluid into said body portion;

said body portion of said inflatable restraint, when inflated, having an inner end portion located between said inflator and an outer end portion of said body portion;

said channel portion of said inflatable restraint being connected with said inflator to receive inflation fluid from said inflator;

said channel portion having a terminal outlet which is disposed intermediate said inner and outer end portions of said body portion for directing inflation fluid from said inflator into said body portion to inflate said body portion.

21. An apparatus as set forth in claim 20 wherein said inflatable restraint when in the deflated condition is rolled into a compact shape disposed adjacent to said inflator, said channel portion of said inflatable restraint unrolling as said channel portion inflates, said body portion of said inflatable restraint inflating after said channel portion of said inflatable restraint unrolls and inflates.

22. An apparatus as set forth in claim 20 wherein said body portion of said inflatable restraint is generally C-shaped in configuration, when inflated, including a pair of side sections joined together by a central section, said central section including said outer end portion of said body portion, said side sections having respective inner end portions which together comprise said inner end portion of said body portion, said channel portion of said inflatable restraint extending into said body portion between said side sections.

23. An apparatus as set forth in claim 22 wherein said channel portion of said inflatable restraint extends in a straight line between said side sections of said body portion, and wherein said terminal outlet of said channel portion opens into said central section of said body portion.

24. A vehicle occupant safety apparatus comprising:

an inflatable vehicle occupant restraint which, when inflated, helps protect a vehicle occupant in the event of an impact to the vehicle of a magnitude sufficient to require protection of the vehicle occupant, said inflatable restraint having a deflated condition and an inflated condition; and an inflator for, when actuated, supplying inflation fluid to said inflatable restraint to inflate said inflatable restraint from the deflated condition to the inflated condition;

said inflatable restraint having a body portion and having an inflation fluid directing channel portion extending said body portion to direct inflation fluid into said body portion;

said inflatable restraint comprising first and second layers of fabric material and two spaced apart stitching sections which join said first and second layers and which define between them said channel portion of said inflatable restraint;

said body portion of said inflatable restraint, when inflated, having an inner end portion located between said inflator and an outer end portion of said body portion;

said channel portion of said inflatable restraint being connected with said inflator to receive inflation fluid from said inflator;

said channel portion having a terminal outlet which is disposed intermediate said inner and outer end portions of said body portion for directing inflation fluid from said inflator into said body portion to inflate said body portion.

25. An apparatus as set forth in claim 24 wherein said inflatable restraint when in the deflated condition is rolled into a compact shape disposed adjacent to said inflator, said channel portion of said inflatable restraint unrolling as said channel portion inflates, said body portion of said inflatable restraint inflating after said channel portion of said inflatable restraint unrolls and inflates.

26. An apparatus as set forth in claim 24 wherein said body portion of said inflatable restraint comprises a pair of flaps having edges which are connected with said channel portion of said inflatable restraint, said flaps being folded to lie adjacent to said channel portion when said inflatable restraint is in the deflated condition, said flaps unfolding away from said channel portion when said inflatable restraint is inflated.

27. An apparatus as set forth in claim 24 wherein said body portion of said inflatable restraint is generally C-shaped in configuration, when inflated, including a pair of side sections joined together by a central section, said central section including said outer end portion of said body portion, said side sections having respective inner end portions which together comprise said inner end portion of said body portion, said channel portion of said inflatable restraint extending into said body portion between said side sections.

28. A vehicle occupant safety apparatus comprising:

an inflatable vehicle occupant restraint having a deflated condition and an inflated condition, said inflatable restraint, when inflated, helping to protect a vehicle occupant in the event of an impact to a side of the vehicle, the impact being of a magnitude sufficient to require protection of the vehicle occupant, said inflatable restraint inflating into a space between the vehicle occupant and a side of the vehicle; and an inflator for, when actuated, supplying inflation fluid to said inflatable restraint to inflate said inflatable restraint from the deflated condition to the inflated condition;

said inflatable restraint having a body portion and having an inflation fluid directing channel portion extending into said body portion;

said body portion of said inflatable restraint having inner and outer end portions;

said channel portion of said inflatable restraint being connected with said inflator to receive inflation fluid from said inflator;

said channel portion having a terminal outlet which is disposed intermediate said inner and outer end portions of said body portion;

said channel portion directing inflation fluid to flow in a first direction from said inflator to said terminal outlet of said channel portion and into said body portion to inflate said body portion;

said outer end portion of said body portion being disposed in the path of fluid flow from said terminal outlet of said channel portion, said outer end portion of said body portion having surface portions which change the direction of inflation fluid flowing from said terminal outlet of said channel portion from the first direction to a second direction, opposite to said first direction, to inflate said body portion of said inflatable restraint.

29. An apparatus as set forth in claim 28 wherein said surface portions are disposed on first and second layers of fabric material sewn together at a terminal end of said inflatable restraint.

30. An apparatus as set forth in claim 28 wherein said surface portions direct the inflation fluid flowing from said terminal outlet of said channel portion into first and second flow paths each extending in the second direction from said surface portions toward said inner end portion of said body portion of said inflatable restraint.

31. A vehicle occupant safety apparatus comprising:

an inflatable vehicle occupant restraint having a deflated condition and an inflated condition, said inflatable restraint, when inflated, helping to protect a vehicle occupant in the event of an impact to a side of the vehicle, the impact being of a magnitude sufficient to require protection of the vehicle occupant, said inflatable restraint inflating into a space between the vehicle occupant and a side of the vehicle; and an inflator for, when actuated, supplying inflation fluid to said inflatable restraint to inflate said inflatable restraint from the deflated condition to the inflated condition;

said inflatable restraint having a body portion and an inflation fluid directing channel portion extending into said body portion;

said body portion of said inflatable restraint having a C-shaped configuration, when inflated, including (i) an upper side section having a closed inner end portion and an open outer end portion, (ii) a lower side section having a closed inner end portion and an open outer end portion, and (iii) an end section extending between said outer end portions of said upper and lower side sections and establishing fluid communication between said outer end portions of said upper and lower side sections;

said channel portion of said inflatable restraint being disposed intermediate said upper and lower side sections of said body portion, said channel portion blocking fluid flow between said inner end portions of said upper and lower side sections;

said channel portion having an inlet connected with said inflator to receive inflation fluid from said inflator;

said channel portion having a terminal outlet into said end section of said body portion for directing inflation fluid from said inflator into said body portion to inflate said body portion.

32. An apparatus as set forth in claim 31 wherein said body portion of said inflatable restraint comprises a pair of flaps having edges which are connected with said channel portion of said inflatable restraint, said flaps being folded against said channel portion when said inflatable restraint is in the deflated condition, said flaps unfolding away from said channel portion when said inflatable restraint is inflated.

33. An apparatus as set forth in claim 32 wherein said channel portion and said flaps are rolled into a compact shape disposed adjacent to said inflator, said channel portion of said inflatable restraint and said flaps unrolling as said channel portion inflates, said flaps unfolding and inflating after said channel portion of said inflatable restraint unrolls and inflates.

34. An apparatus as set forth in claim 33 wherein said channel portion is tubular in configuration, said inflatable restraint comprising first and second layers of fabric material and two spaced apart stitching sections which join said first and second layers and which define between them said channel portion of said inflatable restraint, each one of said stitching sections defining an edge of a respective one of said flaps.

* * * * *